US008449630B2

(12) United States Patent
Lange et al.

(10) Patent No.: US 8,449,630 B2
(45) Date of Patent: May 28, 2013

(54) USE OF AMINES AND/OR MANNICH ADDUCTS IN FUEL AND LUBRICANT COMPOSITIONS FOR DIRECT INJECTION SPARK IGNITION ENGINES

(75) Inventors: Arno Lange, Bad Dürkheim (DE); Hans Peter Rath, Grünstadt (DE); Marc Walter, Frankenthal (DE); Marco Bergemann, Hockenheim (DE); Helmut Schmidt, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 1017 days.

(21) Appl. No.: 10/536,401

(22) PCT Filed: Dec. 1, 2003

(86) PCT No.: PCT/EP03/13512
§ 371 (c)(1),
(2), (4) Date: May 25, 2005

(87) PCT Pub. No.: WO2004/050806
PCT Pub. Date: Jun. 17, 2004

(65) Prior Publication Data
US 2006/0070293 A1 Apr. 6, 2006

(30) Foreign Application Priority Data
Dec. 2, 2002 (DE) .................. 102 56 161

(51) Int. Cl.
*C10L 10/00* (2006.01)
*C10L 1/22* (2006.01)

(52) U.S. Cl.
USPC ............................. 44/412; 44/415

(58) Field of Classification Search
USPC .... 44/415, 329, 419, 412, 423, 432; 564/367; 508/542, 545
See application file for complete search history.

(56) References Cited

U.S. PATENT DOCUMENTS

| | | | |
|---|---|---|---|
| 3,980,569 A | | 9/1976 | Pindar et al. |
| 4,231,759 A | * | 11/1980 | Udelhofen et al. ............. 44/415 |
| 4,334,085 A | * | 6/1982 | Basalay et al. ................ 564/367 |
| 4,454,059 A | | 6/1984 | Pindar et al. |
| 5,405,419 A | * | 4/1995 | Ansari et al. .................... 44/412 |
| 5,634,951 A | * | 6/1997 | Colucci et al. .................. 44/415 |
| 5,725,612 A | | 3/1998 | Malfer et al. |
| 5,876,468 A | | 3/1999 | Moreton |
| 6,242,394 B1 | | 6/2001 | Chamberlin, III |
| 2001/0020345 A1 | | 9/2001 | Haji et al. |
| 2002/0029512 A1 | * | 3/2002 | Thomas et al. ................. 44/434 |
| 2003/0056431 A1 | * | 3/2003 | Schwab et al. ................. 44/419 |
| 2003/0079399 A1 | * | 5/2003 | Malfer et al. ................... 44/329 |
| 2003/0140552 A1 | * | 7/2003 | Schwahn et al. ............... 44/412 |
| 2004/0118035 A1 | * | 6/2004 | Al-Ahmad ...................... 44/415 |
| 2004/0168364 A1 | * | 9/2004 | Macduff et al. ................ 44/415 |
| 2008/0274924 A1 | | 11/2008 | Lange et al. |

FOREIGN PATENT DOCUMENTS

| | | |
|---|---|---|
| EP | 0 811 672 A2 | 12/1997 |
| EP | 1 081 209 | 8/2000 |
| EP | 1 293 553 | 3/2003 |
| JP | 2000-144157 | 5/2000 |
| WO | 00/20537 | 4/2000 |
| WO | WO 01/25294 A1 | 4/2001 |
| WO | 01/42399 | 6/2001 |
| WO | 01/42399 A1 | 6/2001 |
| WO | WO 0142399 * | 6/2001 |
| WO | 02/090471 | 11/2002 |
| WO | 03/076554 | 9/2003 |
| WO | 03/078553 | 9/2003 |

OTHER PUBLICATIONS

Letter from Kendrew H. Colton dated Jun. 19, 2007.
Declaration of David DiBerto dated Jun. 13, 2007.
Paul Mabley, Fuel Business Manager, Ethyl Corportation, Bracknell, UK. "High-Pressure Direct Injection Gasoline- Injector Coking Studies and Additive Solutions", International Fuels Conference, Nov. 2000, Warsaw Poland.
Allen A. Aradi, et al., "A Study of Fuel Additives for Direct Injection Gasoline (DIG) Injector Deposit Control", 2000 CEC and SAE International, pp. 1-12.
SAE International; "First International SAE Fuels & Lubricants Conference to be held in Paris in June"; Warrendale, PA; Feb. 8, 2000; p. 1 of 1.
Program for First SAE International Fuels & Lubricants Conference; Paris, France; Jun. 19-22, 2000; pp. 17-36.
Allen A. Aradi et al; "A Study of Fuel Additives for Direct Injection Gasoline (DIG) Injector Deposit Control"; First SAE International Fuels & Lubricans Meeting & Exposure; Paris, France; Jun. 19-22, 2000.
Allen A. Aradi et al; "The Effect of Fuel Composition, Engine Operating Parameters and Additive Content on Injector Deposits in a High-Pressure Direct Injection Gasoline (DIG) Research Engine"; Aachen Cooloquium for Automobile and Engine Technology; Oct. 4-6, 2000; pp. 187-211.
Letter from Kendrew H. Colten of Fitch, Even, Tabin & Flannery; pp. 1-7 (Aug. 14, 2006).
Supplementary European Search Report, Appln. No. EP 99 97 0110, dated Dec. 14, 2001; Claims—pp. 72-85.
Office Action issued Aug. 26, 2009 in Japanese Patent Application No. 2004-556250 (English translation only).
"Sekiyu Seihin Tenkazai no Kaihatsu to Saishin Gizyutsu", (Development and Contemporary Technique of Petroleum Product Additives), Issued by K.K. CMC, 1998, First Edition, p. 59.
First Declaration of Mr. William Colucci, dated Dec. 13, 2012.
Notice of Opposition to a European patent filed Dec. 21, 2012 for European Patent No. 1570031 (European Application No. 03785698.6).

(Continued)

*Primary Examiner* — Michael Marcheschi
*Assistant Examiner* — Chantel Graham
(74) *Attorney, Agent, or Firm* — Oblon, Spivak, McClelland, Maier & Neustadt, L.L.P.

(57) ABSTRACT

The present invention relates to the use of amines and/or Mannich adducts as detergents and/or dispersants in fuel and lubricant compositions for direct-injection gasoline engines. The invention further relates to fuel and lubricant compositions which comprise at least one such Mannich adduct, and also a bisaminoalkylated Mannich adduct.

26 Claims, No Drawings

OTHER PUBLICATIONS

Grounds of Opposition issued Dec. 2012 in connection with European Patent No. 1570031 (European Application No. 03785698.6).
Opposed Claims for European Patent No. 1570031 ((European Application No. 03785698.6).
Second Declaration of Mr. William Colucci, dated Dec. 13, 2012.
"Gasoline-Engine Management", SAE International, 1999.

* cited by examiner

USE OF AMINES AND/OR MANNICH ADDUCTS IN FUEL AND LUBRICANT COMPOSITIONS FOR DIRECT INJECTION SPARK IGNITION ENGINES

This application is the US national phase of international application PCT/EP2003/013512 filed 1 Dec. 2003 which designated the U.S. and claims benefit of DE 102 56 161.3, dated 2 Dec. 2002, the entire content of which is hereby incorporated by reference.

The present invention relates to the use of amines and/or Mannich adducts as detergents and/or dispersants in fuel and lubricant compositions for direct-injection gasoline engines. The invention further relates to fuel and lubricant compositions which comprise at least one such Mannich adduct, and also a bisaminoalkylated Mannich adduct.

Direct-injection gasoline engines are becoming increasingly important, since, especially in the lean range, i.e. at a lambda value of about 1 or greater, they enable better fuel utilization and a simultaneous increase in the engine output. This is accompanied by reduced carbon dioxide emission in comparison to conventional gasoline engines.

The injection nozzles in direct-injection gasoline engines are disposed in the combustion chamber and are therefore exposed to extreme conditions. Under these conditions, intense decomposition and oxidation of the fuel takes place and an increased amount of deposits forms. Deposition problems affect mainly the injection nozzles, but also the inlet valves and the entire combustion chamber. Deposits on the injection nozzles restrict the fuel feed and change the injection behavior. A slightly reduced fuel feed can be compensated by appropriate electronic control; stronger feed restriction and change in the injection behavior can no longer be counteracted. However, for optimum fuel utilization and performance increase, impeccable injection behavior is essential. Therefore, the formation of deposits is to be avoided to a very substantial extent. In contrast to conventional engines in which relatively rich mixtures cause deposits, it is especially lean mixtures in direct-injection gasoline engines that lead to deposits.

WO 01/42399 describes the use of Mannich bases as fuel additives for preventing deposits in direct-injection gasoline engines. The investigations were carried out using Mannich bases which were based on a phenol substituted by a radical derived from a polyisobutene having a low reactivity, in a fuel-rich mixture (lambda value 0.8). However, commercially obtainable direct-injection gasoline engines work with relatively fuel-lean mixtures, in order to achieve the required petroleum savings. Also, a fuel-rich mixture, for example having a lambda value of 0.8, would impair the function of a customary exhaust gas catalytic converter, and the maximum exhaust gas values laid down in law could be exceeded. The results achieved in WO 01/42399 are not yet satisfactory; in particular, the Mannich bases described there fail on operation of the engine within the lambda range of from 0.9 to 9. Also, the engine used there is not a modern direct injector, which can be seen from the use of an engine having flat top pistons. However, the construction of the cylinder does not correspond to the special cylinder geometry in modern direct injectors which is decisive for uniform fuel distribution.

It is an object of the present invention to provide suitable fuel additives which effectively prevent deposits in direct-injection gasoline engines, even when operating the engine within the lambda range of from 0.9 to 9.

We have found that this object is achieved by the use of a component A comprising at least one amine of the formula $NR^1R^2R^3$ where each $R^1$, $R^2$ and $R^3$ is independently H, $C_1$-$C_{20}$-alkyl or $C_3$-$C_{20}$-cycloalkyl, and two alkyl radicals together with the nitrogen atom to which they are bonded may form a ring and the alkyl and the cycloalkyl radicals may be interrupted by one or more groups selected from O and $NR^4$ and/or may be substituted by one or more $OR^5$ or $NR^6R^7$ groups where $R^4$, $R^5$, $R^6$ and $R^7$ are each independently as defined for $R^1$, $R^2$ and $R^3$, and/or a component B comprising at least one Mannich adduct of the formula I

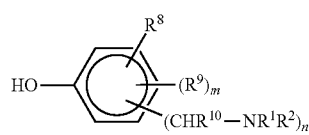

where
$R^1$ and $R^2$ are each independently as defined for $R^1$, $R^2$ and $R^3$ of component A,
$R^8$ is a polyisobutene radical which is preferably derived from reactive polyisobutenes,
$R^9$ is a $C_1$-$C_6$-alkyl group,
$R^{10}$ is H or $C_1$-$C_6$-alkyl,
m is a number from 0 to (4−n) and
n is a number from 1 to 3, as detergents and/or dispersants in fuel and lubricant compositions for direct-injection gasoline engines which are operated within a lambda range of from 0.9 to 9.

This use according to the invention is referred to hereinbelow as use variant 1.

The operation of commercial direct-injection gasoline engines runs through cycles of different lambda values. In use variant 1, the components A and/or B are used in fuel and lubricant compositions for direct-injection gasoline engines in which the engine, in accordance with the invention, is operated for more than 80% of the operating time at a lambda value of at least 0.9 up to and including 9, preferably from 0.95 to 8 and in particular from 0.97 to 6. The lambda value is the ratio of the amount of air introduced into a combustion chamber to the amount of air theoretically required for complete combustion. A mixture having a lambda value of less than 1 is referred to as rich and one having a lambda value of greater than 1 is referred to as lean.

In use variant 1, the molecular weight of the amines $NR^1R^2R^3$ of component A or the sum of the molecular weights of the radicals $NR^1R^2$ in the Mannich adduct I of component B is preferably from 120 to 1000 g/mol and in particular from 180 to 600 g/mol. The molecular weight of the amines of component A is most preferably from 180 to 300 g/mol.

$R^8$ is a polyisobutene radical which is preferably derived from "reactive" polyisobutenes. With regard to the definition of reactive polyisobutenes and the preferred embodiments thereof, reference is made to the remarks on $R^8$ which follow.

The present invention further provides the use of
a component A comprising at least one amine of the formula $NR^1R^2R^3$ where
each $R^1$, $R^2$ and $R^3$ is independently H, $C_1$-$C_{20}$-alkyl or $C_3$-$C_{20}$-cycloalkyl, and two alkyl radicals together with the nitrogen atom to which they are bonded may form a ring and the alkyl and the cycloalkyl radicals may be interrupted by one or more groups selected from O and $NR^4$ and/or may be substituted by one or more $OR^5$ or $NR^6R^7$ groups where $R^4$, $R^5$, $R^6$ and $R^7$ are each independently as defined for $R^1$, $R^2$ and $R^3$, with the proviso that the molecular weight of the amine $NR^1R^2R^3$ is from 120 to 1000 g/mol and/or
a component B comprising at least one Mannich adduct of the formula I

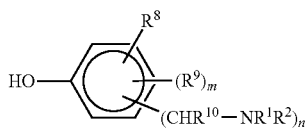

where $R^1$ and $R^2$ are each independently as defined for $R^1$, $R^2$ and $R^3$ of component A, with the proviso that the sum of the molecular weights of the radicals $NR^1R^2$ is from 120 to 1000 g/mol, $R^8$ is a poly(iso)butene radical, $R^9$ is a $C_1$-$C_6$-alkyl group, $R^{10}$ is H or $C_1$-$C_6$-alkyl, m is a number from 0 to (4−n) and n is a number from 1 to 3, as detergents and/or dispersants in fuel and lubricant compositions for direct-injection gasoline engines.

The use variant described here is referred to hereinbelow as use variant 2.

Preferably in both variants component B is used alone or as a mixture with component A.

In use variant 2, the molecular weight of the amines $NR^1R^2R^3$ of component A or the sum of the molecular weights of the radicals $NR^1R^2$ in the Mannich adduct I of component B is preferably from 180 to 600 g/mol. The molecular weight of the amines of component A is more preferably from 180 to 300 g/mol.

In use variant 2, the components A and/or B are used in fuel and lubricant compositions for direct-injection gasoline engines in which the engine is preferably operated for more than 80% of the operating time at a lambda value of preferably from 0.9 to 9, more preferably from 0.95 to 8 and in particular from 0.97 to 6.

In both use variants 1 and 2, $C_1$-$C_{20}$-alkyl in the above definitions of the groups $R^1$, $R^2$, $R^3$, $R^4$, $R^5$, $R^6$ and $R^7$ is straight-chain or branched alkyl, in particular methyl, ethyl, n-propyl, isopropyl, n-butyl, sec-butyl, isobutyl, tert-butyl, 1-, 2- or 3-pentyl, 1-, 2-, 3- or 4-methylbutyl, 1,1-, 1,2-, 1,3- or 2,2-dimethylpropyl, 1-, 2- or 3-hexyl, 2-, 3- or 4-methylpentyl, 1,1-, 1,2-, 1,3-, 2,2-, 2,3- or 3,3-dimethylbutyl, 2-ethylbutyl, 1-, 2-, 3- or 4-heptyl, 2-, 3-, 4- or 5-methylhexyl, 1,1-, 1,2-, 1,3-, 1,4-, 2,2-, 2,3-, 2,4-, 3,3-, 3,4- or 4,4-dimethylpentyl, 2- or 3-ethylpentyl, 1-, 2-, 3- or 4-octyl, 2-, 3-, 4-, 5- or 6-methylhexyl, 1,1-, 1,2-, 1,3-, 1,4-, 1,5-, 2,2-, 2,3-, 2,4-, 2,5-, 3,3-, 3,4-, 3,5-, 4,4-, 4,5- or 5,5-dimethylhexyl, 2-, 3- or 4-ethylhexyl, nonyl, decyl, undecyl, dodecyl, tridecyl, tetradecyl, pentadecyl, hexadecyl, heptadecyl, octadecyl, nonadecyl or eicosyl. The alkyl group may also be substituted by one or more $C_3$-$C_{20}$-cycloalkyl radicals.

When 2 alkyl groups together with the nitrogen atom of the $NR^1R^2$ group of the Mannich adduct I or of the amine $NR^1R^2R^3$ form a ring, in which case the alkyl group may be interrupted by an O or $NR^4$ moiety, the ring is, for example, piperidine, piperazine or morpholine.

In the above definitions of the groups $R^1$, $R^2$, $R^3$, $R^4$, $R^5$, $R^6$ and $R^7$, the $C_3$-$C_{20}$-cycloalkyl group is, for example, cyclopropyl, cyclopentyl, cyclohexyl, cyclooctyl or cyclodecyl.

The cycloalkyl group may be substituted by one or more $C_1$-$C_{20}$-alkyl groups. Examples thereof are 3-methylcyclopentyl and 4-methylcyclohexyl.

In the above definition of the groups $R^9$ and $R^{10}$, $C_1$-$C_6$-alkyl is in particular methyl, ethyl, n-propyl, isopropyl, n-butyl, sec-butyl, isobutyl, tert-butyl, 1-, 2- or 3-pentyl, 1-, 2-, 3- or 4-methylbutyl, 1,1-, 1,2-, 1,3- or 2,2-dimethylpropyl, 1-, 2- or 3-hexyl, 2-, 3- or 4-methylpentyl, 1,1-, 1,2-, 1,3-, 2,2-, 2,3- or 3,3-dimethylbutyl or 2-ethylbutyl.

The radicals $R^1$, $R^2$ and $R^3$ are preferably each independently branched or unbranched $C_6$-$C_{20}$-alkyl, such as 1-, 2- or 3-hexyl, 2-, 3- or 4-methylpentyl, 1,1-, 1,2-, 1,3-, 2,2-, 2,3- or 3,3-dimethylbutyl, 2-ethylbutyl, 1-, 2-, 3- or 4-heptyl, 2-, 3-, 4- or 5-methylhexyl, 1,1-, 1,2-, 1,3-, 1,4-, 2,2-, 2,3-, 2,4-, 3,3-, 3,4- or 4,4-dimethylpentyl, 2- or 3-ethylpentyl, 1-, 2-, 3- or 4-octyl, 2-, 3-, 4-, 5- or 6-methylhexyl, 1,1-, 1,2-, 1,3-, 1,4-, 1,5-, 2,2-, 2,3-, 2,4-, 2,5-, 3,3-, 3,4-, 3,5-, 4,4-, 4,5- or 5,5-dimethylhexyl, 2-, 3- or 4-ethylhexyl, nonyl, decyl, undecyl, dodecyl, tridecyl, tetradecyl, pentadecyl, hexadecyl, heptadecyl, octadecyl, nonadecyl or eicosyl, $C_6$-$C_{20}$-cycloalkyl, such as cyclohexyl, cyclooctyl or cyclodecyl, or

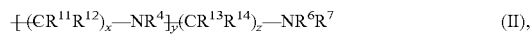 (II),

 (III) or

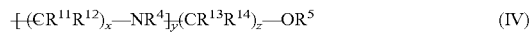 (IV)

where $R^4$, $R^5$, $R^{11}$, $R^{12}$, $R^{13}$ and $R^{14}$ are each independently H or $C_1$-$C_6$-alkyl, $R^6$ and $R^7$ are each independently H, $C_1$-$C_6$-alkyl or $C_1$-$C_6$-hydroxyalkyl, x and z are each independently a number from 1 to 20 and y is a number from 0 to 10.

In the above definition of the groups $R^4$, $R^5$, $R^6$, $R^7$, $R^{11}$, $R^{12}$, $R^{13}$ and $R^{14}$, $C_1$-$C_6$-alkyl is in particular methyl, ethyl, n-propyl, isopropyl, n-butyl, sec-butyl, isobutyl, tert-butyl, 1-, 2- or 3-pentyl, 1-, 2-, 3- or 4-methylbutyl, 1,1-, 1,2-, 1,3- or 2,2-dimethylpropyl, 1-, 2- or 3-hexyl, 2-, 3- or 4-methylpentyl, 1,1-, 1,2-, 1,3-, 2,2-, 2,3- or 3,3-dimethylbutyl or 2-ethylbutyl.

$R^{11}$, $R^{12}$, $R^{13}$ and $R^{14}$ are preferably each H.

In both use variants 1 and 2, suitable amines of component A are both monoamines, i.e. amines having only one amine function in the molecule, and polyamines, i.e. amines having at least two amine functions in the molecule. If component A is an alkylamine, especially a monoalkylamine, it is preferably not used alone in both variants. Especially linear monoalkylamines are not used alone.

Suitable monoamines are both primary and secondary or tertiary amines. Primary amines are those in which two of the $R^1$, $R^2$ and $R^3$ radicals are each H. For both use variants 1 and 2, examples of suitable primary monoamines are octylamine, 2-ethylhexylamine, nonylamine, decylamine, undecylamine, dodecylamine, tridecylamine, tetradecylamine, pentadecylamine, hexadecylamine, heptadecylamine, octadecylamine, nonadecylamine, eicosylamine, and also cyclooctylamine and cyclodecylamine. In use variant 1, further suitable primary amines are methylamine, ethylamine, propylamine, butylamine, pentylamine, hexylamine and heptylamine. Secondary amines are those in which one of the $R^1$, $R^2$ and $R^3$ radicals is H. For both use variants 1 and 2, examples of suitable secondary monoamines are dibutylamine, diisobutylamine, di-tert-butylamine, dipentylamine, dihexylamine, diheptylamine, dioctylamine, di(2-ethylhexylamine), dinonylamine and didecylamine, and also N-methylcyclohexylamine, N-ethylcyclohexylamine and dicyclohexylamine. In use variant 1, further suitable secondary amines are dimethylamine, diethylamine, dipropylamine and diisopropylamine. Tertiary amines are those in which none of the three $R^1$, $R^2$ and $R^3$ radicals is H. For both use variants 1 and 2, examples of suitable tertiary amines are tripropylamine, triisopropylamine, tributylamine, tripentylamine, trihexylamine, triheptylamine, trioctylamine, trinonylamine and tridecylamine, and also N-methyldicyclohexylamine and N-ethyldicyclohexylamine. In use variant 1, further suitable tertiary amines are trimethylamine and triethylamine. Also suitable are all isomers of the abovementioned amines. Preferred monoamines are secondary amines, in particular those in which the two radicals which are not H are the same. Preference is given to using mixtures of monoamines, in particular amine mixtures which are accessible on the industrial scale, such as fatty amines, as described, for example, in Ullmann's Encyclopedia of Industrial Chemistry, 6th edition, 2000, electronic release, "Amines, aliphatic", which is fully incorporated herein by way of reference.

Examples of suitable cyclic monoamines for use variant 1 are pyrrolidine, piperidine and morpholine.

Suitable polyamines for both use variants 1 and 2 are amines of the formula $NR^1R^2R^3$ where at least one of the $R^1$, $R^2$ or $R^3$ radicals is a radical of the formula II, III or IV

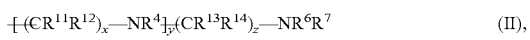  (II),

  (III) or

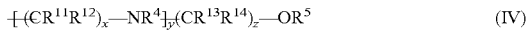  (IV)

where
$R^4$, $R^5$, $R^{11}$, $R^{12}$, $R^{13}$ and $R^{14}$ are each independently H or $C_1$-$C_6$-alkyl;
$R^6$, $R^7$, $R^{15}$ and $R^{16}$ are each independently H, $C_1$-$C_6$-alkyl or $C_1$-$C_6$-hydroxyalkyl,
x and z are each independently a number from 1 to 20 and
y is a number from 0 to 10, although y may not be 0 in formula IV.

The polyamine used is preferably an amine in which at least one $R^1$, $R^2$ or $R^3$ radical is a radical of the formula II. Preference is given to radicals II in which $R^4$, $R^{11}$, $R^{12}$, $R^{13}$ and $R^{14}$ are each H, x and z are a number from 1 to 8 and y is a number from 0 to 10. Examples of such polyamines are triethylenetetramine, tetraethylenepentamine, pentaethylenehexamine, dipropylenetriamine, tripropylenetetramine, tetrapropylenepentamine, dibutylenetriamine, tributylenetetramine, tetrabutylenepentamine, N,N-dipropylmethylenediamine, N,N-dipropylethylene-1,2-diamine, N,N-diethylpropylene-1,3-diamine, N,N-dipropylpropylene-1,3-diamine, N,N-diethylbutylene-1,4-diamine, N,N-dipropylbutylene-1,4-diamine, N,N-dimethylpentylene-1,3-diamine, N,N-diethylpentylene-1,5-diamine, N,N-dipropylpentylene-1,5-diamine, N,N-dimethylhexylene-1,6-diamine, N,N-diethylhexylene-1,6-diamine, N,N-dipropylhexylene-1,6-diamine, bis[2-(N,N-dimethylamino)ethyl]amine, bis[2-(N,N-dipropylamino)ethyl]amine, bis[3-(N,N-dimethylamino)propyl]amine, bis[3-(N,N-diethylamino)-propyl]amine, bis[3-(N,N-dipropylamino)propyl]amine, bis[4-(N,N-dimethylamino)butyl]amine, bis[4-(N,N-diethylamino)butyl]amine, bis[4-(N,N-dipropylamino)butyl]amine, bis[5-(N,N-dimethylamino)-pentyl]amine, bis[5-(N,N-diethylamino)pentyl]amine, bis[5-(N,N-dipropylamino)pentyl]amine, bis[6-(N,N-dimethylamino)-hexyl]amine, bis[6-(N,N-diethylamino)hexyl]amine, bis[6-(N,N-dipropylamino)hexyl]amine, tris[2-(N,N-dimethylamino)ethyl]amine, tris[2-(N,N-dipropylamino)ethyl]amine, tris[3-(N,N-dimethylamino)propyl]amine, tris[3-(N,N-diethylamino)propyl]amine, tris[3-(N,N-dipropylamino)propyl]amine, tris[4-(N,N-dimethylamino)butyl]amine, tris[4-(N,N-diethylamino)-butyl]amine, tris[4-(N,N-dipropylamino)butyl]amine, tris[5-(N,N-dimethylamino)pentyl]amine, tris[5-(N,N-diethylamino)pentyl]amine, tris[5-(N,N-dipropylamino)pentyl]amine, tris[6-(N,N-dimethylamino)hexyl]amine, tris[6-(N,N-diethylamino)-hexyl]amine, tris[6-(N,N-dipropylamino)hexyl]amine and the like. In use variant 1, also suitable are ethylenediamine, diethylenetriamine and N,N-dimethylpropylene-1,3-diamine. Among these, preference is given in both use variants 1 and 2 to triethylenetetramine, tetraethylenepentamine and bis[3-N,N-dimethylamino)propyl]amine. In use variant 1, preference is further given to diethylenetriamine and N,N-dimethylpropylene-1,3-diamine.

Examples of suitable cyclic polyamines for both use variants are diethylpiperazine and N,N',N"-tris(N,N-dimethylamino)propylhexahydrosymtriazine. In both use variants 1 and 2, $R^9$ in the Mannich adduct I of component B is preferably a $C_1$-$C_4$-alkyl group, such as methyl, ethyl, n-propyl, isopropyl, n-butyl, sec-butyl, isobutyl or tert-butyl. Particular preference is given to $R^9$ being methyl or ethyl, in particular methyl.

Depending on the number of ($CHR^{10}$—$NR^1R^2$) radicals (i.e. on n), the variable m is a number from 0 to (4−n). Preferably, m is a number from 0 to 2, more preferably 0 or 1 and especially 0.

$R^{10}$ is H or $C_1$-$C_6$-alkyl, preferably H.

$R^1$ and $R^2$ are each independently H, $C_1$-$C_{20}$-alkyl or $C_3$-$C_{20}$-cycloalkyl, and two alkyl radicals may also together form a ring with the nitrogen atom to which they are bonded and the alkyl and cycloalkyl radicals as described above may be interrupted by one or more O or $NR^4$ groups and/or may be substituted by one or more $OR^5$ or $NR^6R^7$ groups where $R^4$, $R^5$, $R^6$ and $R^7$ are each independently as defined for $R^1$ and $R^2$. It is essential to the invention in use variant 2 that the sum of the molecular weight of n $NR^1R^2$ radicals is from 120 to 1000 g/mol, preferably from 180 to 600 g/mol and more preferably from 230 to 600 g/mol. In order to fulfil this proviso, $R^1$ and $R^2$ in use variant 2 must not at the same time be H. In use variant 1, the sum of the molecular weight of n $NR^1R^2$ radicals is preferably from 120 to 1000 g/mol, particularly preferably from 120 to 800 g/mol, more preferably from 180 to 600 g/mol and in particular from 230 to 600 g/mol. $R^1$ and $R^2$ are preferably not both H at the same time.

In both use variants 1 and 2, $R^1$ and $R^2$ are preferably each independently H, $C_6$-$C_{20}$-alkyl, $C_6$-$C_{20}$-cycloalkyl or a radical of the following formulae II to IV

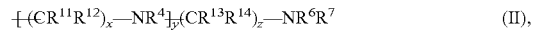  (II),

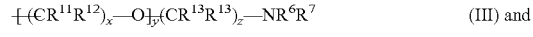  (III) and

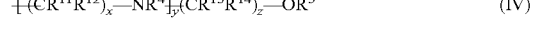  (IV)

where
$R^4$, $R^5$, $R^{11}$, $R^{12}$, $R^{13}$ and $R^{14}$ are each independently H or $C_1$-$C_6$-alkyl;
$R^6$ and $R^7$ are each independently H, $C_1$-$C_6$-alkyl or $C_1$-$C_6$-hydroxyalkyl,
x and z are each independently a number from 1 to 20, preferably from 1 to 6, and
y is a number from 0 to 10.
$R^{11}$, $R^{12}$, $R^{13}$ and $R^{14}$ are preferably each H.
$R^4$ and $R^5$ are preferably each H or $C_1$-$C_6$-alkyl, more preferably H or methyl.
$R^6$ and $R^7$ are preferably each H, methyl, ethyl, propyl, isopropyl, butyl, sec-butyl, isobutyl, tert-butyl, pentyl, hexyl, hydroxymethyl, 2-hydroxyethyl or 3-hydroxypropyl and more preferably methyl.

$R^1$ and $R^2$ are preferably each the same radical. In a particularly preferred embodiment, both $R^1$ and $R^2$ are a radical of the formula II where y is 0, z is a number from 3 to 6, $R^{13}$ and $R^{14}$ are each H and both $R^6$ and $R^7$ are each methyl, ethyl, propyl, hydroxymethyl or hydroxyethyl. z is especially 3 and $R^6$ and $R^7$ are methyl, i.e. $NR^1R^2$ is especially $N[(CH_2)_3N(CH_3)_2]_2$.

In a further preferred embodiment, $R^1$ and $R^2$ are each a $C_6$-$C_{10}$-alkyl radical, such as 1-, 2- or 3-hexyl, 2-, 3- or 4-methylpentyl, 1,1-, 1,2-, 1,3-, 2,2-, 2,3- or 3,3-dimethylbutyl, 2-ethylbutyl, 1-, 2-, 3- or 4-heptyl, 2-, 3-, 4- or 5-methylhexyl, 1,1-, 1,2-, 1,3-, 1,4-, 2,2-, 2,3-, 2,4-, 3,3-, 3,4- or 4,4-dimethylpentyl, 2- or 3-ethylpentyl, 1-, 2-, 3- or 4-octyl, 2-, 3-, 4-, 5- or 6-methylhexyl, 1,1-, 1,2-, 1,3-, 1,4-, 1,5-, 2,2-, 2,3-, 2,4-, 2,5-, 3,3-, 3,4-, 3,5-, 4,4-, 4,5- or 5,5-dimethylhexyl, 2-, 3- or 4-ethylhexyl, nonyl or decyl, more preferably a $C_8$-alkyl radical and especially 2-ethylhexyl. $R^1$ and $R^2$ are preferably each the same radical.

n is a number from 1 to 3, preferably a number from 1 to 2 and in particular 2.

The proviso essential to the invention in use variant 2 that the sum of the molecular weights of the $NR^1R^2$ radicals should be from 120 to 1000 should be interpreted in such a way that the molecular weight of one $NR^1R^2$ radical in n identical ($CHR^{10}$—$NR^1R^2$) radicals is from 120/n to 1000/n. Correspondingly, suitable $NR^1R^2$ radicals are dependent upon the total number n of ($CHR^{10}$—$NR^1R^2$) radicals with regard to the molecular weight. In the case of different ($CHR^{10}$—$NR^1R^2$) radicals in the Mannich adduct I, the weight-averaged value of the molecular weight of n radicals is from 120 to 1000 g/mol. The same applies correspondingly in the preferred embodiment of use variant 1, in which the sum of the molecular weights of the $NR^1R^2$ radicals is from 120 to 1000.

In both use variants 1 and 2, Mannich adducts of the formula I are obtainable, for example, by the reaction of a phenol, substituted by a polyolefin radical $R^8$, of the formula V

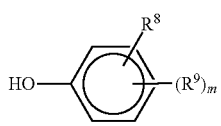

where $R^8$, $R^9$ and m are each as defined in the particular use variants 1 and 2,
in a Mannich(-like) reaction with an aldehyde $CHR^{10}O$ and an amine $NHR^1R^2$ where $R^{10}$, $R^1$ and $R^2$ are each as defined above. With regard to the preferred reactants V, aldehyde and amine, the remarks made in the particular use variants on $R^8$, $R^9$, $R^{10}$, $R^1$, $R^2$ and n and also the remarks below on $R^8$ apply.

Suitable aldehydes $CHR^{10}O$ are formaldehyde, acetaldehyde, propionaldehyde and butyraldehyde or compounds from which these aldehydes are accessible. These are referred to generally hereinbelow as aldehyde sources. Preference is given to using formaldehyde. Suitable formaldehyde sources are formaldehyde gas, formalin solutions, formaldehyde oligomers such as trioxane or tetraoxane and polymers of formaldehyde such as paraformaldehyde. Preference is given to using paraformaldehyde or formalin solution.

The phenol V can be converted to the Mannich adducts I in two different ways. In the first, it can be reacted at the same time with the aldehyde and the amine $NHR^1R^2$. Preferably, the amine in this reaction variant (variant A) has no primary amino function, since relatively large amounts of undesired oligomerization products would otherwise occur. For the purposes of this invention, primary amino functions are those of the formula $NH_2R$, where R is a substituent other than hydrogen. In the second, the phenol V can be reacted with an adduct of an aldehyde and an amine of the formula $NHR^1R^2$ prepared beforehand (variant B). In this case, the amine can also have a primary amino function, i.e. one of the $R^1$ or $R^2$ radicals can be H.

The remarks made above on $R^1$ and $R^2$ apply for suitable amines $NHR^1R^2$. Examples of amines in which $R^1$ and/or $R^2$ is $C_1$-$C_{20}$-alkyl include propylamine, isopropylamine, butylamine, pentylamine, hexylamine, heptylamine, octylamine, diethylamine, dipropylamine, diisopropylamine, dibutylamine, dipentylamine, dihexylamine, diheptylamine, dioctylamine, di(2-ethylhexyl)amine, dinonylamine and didecylamine. Examples of suitable amines in which $R^1$ and/or $R^2$ is/are each a radical of the formula II are diethylenetriamine, triethylenetetramine, tetraethylenepentamine, pentaethylenehexamine, propylenediamine, dipropylenetriamine, tripropylenetetramine, tetrapropylenepentamine, butylenediamine, dibutylenetriamine, tributylenetetramine, tetrabutylenepentamine, N,N-dimethylmethylenediamine, N,N-diethylmethylenediamine, N,N-dipropylmethylenediamine, N,N-dimethylethylene-1,2-diamine, N,N-diethylethylene-1,2-diamine, N,N-dipropylethylene-1,2-diamine, N,N-dimethylpropylene-1,3-diamine, N,N-diethylpropylene-1,3-diamine, N,N-dipropylpropylene-1,3-diamine, N,N-dimethylbutylene-1,4-diamine, N,N-diethylbutylene-1,4-diamine, N,N-dipropylbutylene-1,4-diamine, N,N-dimethylpentylene-1,3-diamine, N,N-diethylpentylene-1,5-diamine, N,N-dipropylpentylene-1,5-diamine, N,N-dimethylhexylene-1,6-diamine, N,N-diethylhexylene-1,6-diamine, N,N-dipropylhexylene-1,6-diamine, bis[(N,N-dimethylamino)methyl]amine, bis[(N,N-diethylamino)methyl]amine, bis[(N,N-dipropylamino)-methyl]amine, bis[2-(N,N-dimethylamino)ethyl]amine, bis[2-(N,N-dipropylamino)ethyl]amine, bis[3-(N,N-dimethylamino)propyl]amine, bis[3-(N,N-diethylamino)propyl]amine, bis[3-(N,N-dipropylamino)propyl]amine, bis[4-(N,N-dimethylamino)-butyl]amine, bis[4-(N,N-diethylamino)butyl]amine, bis[4-(N,N-dipropylamino)butyl]amine, bis[5-(N,N-dimethylamino)-pentyl]amine, bis[5-(N,N-diethylamino)pentyl]amine, bis[5-(N,N-dipropylamino)pentyl]amine, bis[6-(N,N-dimethyl-amino)hexyl]amine, bis[6-(N,N-diethylamino)hexyl]amine, bis[6-(N,N-dipropylamino)hexyl]amine and the like. Also suitable for preparing the Mannich adducts I used in use variant 1 are methylamine, ethylamine, dimethylamine and ethylenediamine.

Particularly preferred amines are bis[3-(N,N-dimethylamino)-propyl]amine and di(2-ethylhexyl)amine.

The reaction temperatures suitable for the reaction of variant A depend on a series of factors. Water of reaction is formed in the Mannich reaction in variant A. In general, this is removed from the reaction mixture. The water of reaction can be removed during the reaction, at the end of the reaction time or on completion of reaction, for example distillatively. Advantageously, the water of reaction can be removed by heating the reaction mixture in the presence of azeotroping agents. Examples of suitable azeotroping agents are organic solvents which form an azeotrope with water and/or have a boiling point above the boiling point of water.

Particularly suitable azeotroping agents are benzene and alkyl aromatics, in particular toluene, xylenes and mixtures of alkyl aromatics with other (high-boiling) hydrocarbons. It is particularly simple to use certain distillation fractions of crude oil which are generally sold according to flash point or boiling range or else aromatics content. Examples thereof are the Solvesso and the Risella brands. In general, the removal of the water of reaction is carried out at a temperature which corresponds approximately to the boiling point of the azeotroping agent or of the azeotrope composed of water and azeotroping agent.

Suitable temperatures for the removal of the water of reaction at atmospheric pressure are therefore in the range from 75 to 200° C., preferably from 80 to 180° C., and more preferably in the range from 80 to 150° C. When the water of reaction is removed under reduced pressure, the temperatures should be reduced in accordance with the reduced boiling temperatures.

The reaction temperatures for the Mannich reaction in variant A are preferably in the range from 10 to 200° C., in particular in the range from 20 to 180° C., for example about 35° C., about 90° C., about 120° C., 140° C. or about 160° C.

The reaction in variant A can, for example, be carried out in such a way that phenol, amine and aldehyde source are combined and the reaction mixture is brought to the desired reaction temperature, preferably within the abovementioned temperature ranges. The reaction can also be carried out in such a way that the phenol and optionally a solvent are first admixed with the aldehyde source and optionally heated to the reaction temperature and at least one secondary amine is subsequently added. The amine can be added in one portion or over a period of, for example, from 5 to 300 minutes by repeated addition in portions or continuous addition. The reaction can also be carried out in such a way that first phenol V and any solvent and amine are added, optionally heated to reaction temperature and subsequently admixed with the aldehyde source, and the aldehyde source can be added as described above for the amine.

In a preferred embodiment, variant A, i.e. the Mannich reaction and the removal of the water of reaction, is carried out, for instance, at atmospheric pressure and a temperature of about 80° C., about 110° C. or about 130° C. using aromatic solvents, preferably toluene, xylenes or mixtures thereof, as azeotroping agents. Variant A is preferably carried out in such a way that the reactants are combined within a temperature range between 10 and 50° C., optionally mixed within this temperature range and subsequently brought to the temperature required to distillatively remove the water of reaction.

The total reaction time for the conversion of the phenols V to the Mannich adducts I can be selected by those skilled in the art depending on the reaction parameters such as temperature and amounts of reactants, and is generally between 10 minutes and 24 hours.

To prepare the Mannich adducts I used in use variant 2, the reactants in variants A or B of the Mannich reaction are used in ratios which depend in use variant 2 on the molecular weight of the amine used.

If the molecular weight of the amine is 120 g/mol or less, the reactant ratio has to be selected in such a way that a bisaminoalkylated phenol I can be formed, in order to fulfill the proviso essential to the invention in use variant 2 with regard to the molecular weight of n $NHR^1R^2$ radicals. Accordingly, the molar ratio of phenol V to amine to aldehyde is generally 1:2-3:2-3, preferably 1:2.0-2.5:2.0-2.5, more preferably about 1:2:2.

If the molecular weight of the amine used is at least 121 g/mol, the reactant ratio can be selected in such a way that, depending on the desired degree of aminomethylation, mono- or bisaminoalkylated phenols I can be formed, because the abovementioned proviso regarding the molecular weight in use variant 2 is in this case fulfilled even in the case of a single aminoalkylated phenol. Accordingly, the ratio of phenol V to amine to aldehyde is suitably 1:0.8-3.0:0.8-3.0, preferably 1:1.0-2.5:1.0-2.5 and more preferably about 1:1.0-2.0:1.0-2.0.

In a particularly preferred embodiment, the ratio of phenol V to amine to aldehyde is about 1:2:2, irrespective of the type of amine selected.

To prepare the Mannich adducts used in use variant 1, these reactant ratios are not obligatory, but preferred.

In variant B, an adduct is initially prepared from aldehyde or an aldehyde equivalent, such as dichloromethane or dibromomethane or dimethoxymethane, amine, and optionally solvent by combining the components, optionally with heating to temperature ranges described above for variant A and within the reaction times described above for variant A. During or after the reaction of amine and aldehyde source, water of reaction formed may, if desired, be removed, for example as described above. The reaction product obtained in this way from amine and aldehyde may, if desired, be purified and/or isolated. The adducts in particular which are obtainable by reacting one equivalent of aldehyde or one equivalent of an aldehyde equivalent with one or two equivalents of a secondary amine or one equivalent of a primary amine after removing the water of reaction, alcohol or halide formed (secondary amine: alkyleneiminium ion or aminal; primary amine: imine or hexahydrotriazine) can, if desired, be isolated, purified and/or stored for a later reaction with the phenol V. Subsequently, the reaction product of amine and aldehyde or aldehyde equivalent and the phenol V are admixed together, and they may be combined in one portion, in a plurality of portions or continuously, within the abovementioned periods. Reaction temperatures and reaction times are typically within the ranges as described above for the reactions of variant A. When the reaction product of aldehyde or aldehyde equivalent and amine is isolated, the reaction with the phenol V is preferably carried out in such a way that the phenol and any solvents are initially charged, the initial charge is optionally heated to a temperature within the range from 50 to 180° C. and the adduct of amine and aldehyde or aldehyde equivalent is subsequently added. The reaction mixture is then heated to a suitable reaction temperature. If desired, the amine formed in the reaction of aminals with the phenol may, depending on the volatility of the amine, be distilled off and/or removed under reduced pressure.

When the reaction described under variant B without isolation of the adduct of aldehyde or aldehyde equivalent and amine(s) is carried out, preference is given to first combining the aldehyde source or the aldehyde equivalent and amine, optionally heating and mixing and admixing the adduct with the phenol V. To this end, preference is given to adding the phenol V to the adduct in the initial charge and heating the mixture to a suitable reaction temperature. Suitable reaction temperatures therefor are, for example, in the range from 25 to 120° C. and in particular in the range from 50 to 100° C.

According to variant B, when using primary amines, the adduct used is preferably an imine or N-substituted hexahydrotriazine which has optionally been isolated beforehand and whose substituents are derived from the abovementioned $R^1$ or $R^2$ radicals.

According to variant B, when using secondary amines, the adduct used is preferably a hemiaminal, alkyleneiminium ion or aminal, each of which has optionally been isolated beforehand, and the amino functions of the hemiaminal, alkyleneiminium ion or aminal are preferably derived from the abovementioned secondary amines $HNR^1R^2$.

In variant B, the adduct used is preferably an adduct of at least one amine and an aldehyde source, said adduct being obtainable by processes known per se. To this end, the reactants are advantageously reacted together at a temperature above 0° C., preferably above +20° C., for example within a temperature range of from 20 to 30° C. or from about 20 to 50° C. Optionally, water of reaction formed can subsequently be removed under the conditions described above for variant A, for example distillatively.

Suitable solvents for the reaction of variant B are the solvents and azeotroping agents described for the reaction of variant A and also hydrocarbons and hydrocarbon mixtures having boiling points or ranges between +35 and +110° C., alcohols, $C_2$-$C_6$-dialkyl ethers, cyclic mono- and diethers having from 3 to 6 carbon atoms, in particular ethanol, isopropanol, butanols, tetrahydrofuran, tetrahydropyran and dioxane.

In variant B, the adduct used is preferably an aminal of the aldehyde with a secondary amine as defined above.

Suitable aminals for the above-described reaction are, for example, N,N,N',N'-tetramethylmethylenediamine and N,N,N',N'-tetraethylmethylenediamine.

In a further embodiment of variant B, the phenols V can be reacted in an analogous reaction with hemiaminals to give Mannich adducts. Such hemiaminals are obtainable from aldehyde sources or aldehyde equivalents and secondary amines which have no primary amino function and can be obtained in a one-pot reaction in the presence of the phenols V (variant A) or separately (variant B).

By means of the procedures described above under variant A and variant B, the phenol V can be converted to mono- and bisaminoalkylated Mannich adducts by choosing the stoichiometry.

In a preferred embodiment, the aldehyde source or the aldehyde equivalent, preferably formalin solution or paraformaldehyde, optionally in solvent, is first initially charged, and an approximately equimolar amount of a secondary amine, preferably of an amine having only one secondary and no primary amino group, is added at a temperature within the range from +15 to +50° C., preferably from +20 to +35° C. Subsequently, the mixture is mixed at a temperature within the above-specified range and then combined with the phenol V and optionally further solvent. Subsequently, the mixture obtained in this way is heated to a temperature within the range from 40 to 100° C., preferably from 50 to 90° C., for example under reflux. Subsequently, the reaction mixture may, if desired, be purified, for example by filtering and/or removing the volatile constituents, for example under reduced pressure or by distillation.

In a further preferred embodiment, the phenol V is optionally initially charged in a solvent and the mixture is heated to a temperature in the range from 40 to 100° C., preferably from 50 to 90° C., for example under reflux of the solvent. Subsequently, either an approximately equimolar amount or from 1.7 to 2.5 equivalents, for example about 2 equivalents, of an aminal, optionally in a solvent, are added slowly at this temperature and the reaction mixture is allowed to react for a further 30 minutes to 4 hours, in particular from 1 to 3 hours, at a temperature in the abovementioned ranges. The reaction mixture can optionally be subsequently purified, for example by filtering and/or removing the volatile constituents under reduced pressure or by distillation.

Suitable solvents for the two above-described embodiments of variant B are hydrocarbons, hydrocarbon mixtures, ethers or alcohols, each having a boiling point or boiling range in the range from 40 to 100° C., in particular from 50 to 90° C. Especially suitable are tetrahydrofuran and dioxane.

In a further preferred embodiment, first the phenol V and optionally solvent are initially charged. Subsequently, an approximately equimolar amount or preferably from 1.7 to 2.5 equivalents, for example about 2 equivalents, of an aldehyde source and of a preferably secondary amine, more preferably an amine without primary and without further secondary amino functions, and optionally solvent, is added slowly, for example by dropwise addition. Subsequently, the components are mixed and the mixture is then heated to a temperature in the range from 40 to 100° C., preferably from 50 to 90° C. The reaction mixture may subsequently be purified, for example by filtering and/or removing the volatile constituents under reduced pressure or by distillation. Suitable as solvents are in particular the solvents specified in the above-described preferred embodiments. Preference is given to isopropanol.

In a further preferred embodiment, phenol V and an approximately equimolar amount or preferably from 1.7 to 2.5 equivalents, for example about 2 equivalents, of a preferably secondary amine, more preferably an amine without primary and without further secondary amino functions, are initially charged in solvent. Subsequently, an approximately equimolar amount of an aldehyde source is added slowly. Preference is given to heating the reaction mixture during the addition of the aldehyde source to a temperature in the range from 30 to 70° C., preferably from 40 to 60° C. Subsequently, the reaction mixture is heated to a temperature in the range from 80 to 180° C., preferably from 90 to 140° C., and more preferably to reflux of the solvent. This preferably distillatively removes the water of reaction formed. Suitable solvents for this embodiment are in particular aromatic solvents or mixtures thereof with further high-boiling hydrocarbons. Particularly suitable are xylenes and toluene and mixtures thereof.

In general, the above-described process provides a Mannich adduct mixture which comprises at least 40 mol %, frequently at least 50 mol % and more preferably at least 60 mol %, of compounds of the formula I. The compounds I can be isolated from the reaction mixture and fed to the use according to the invention. However, it is equally possible in accordance with the invention to use the compounds I in the form of the entire reaction mixture which is obtained from the process described above.

In the definition of $R^8$ in use variant 2, the poly(iso)butene radical is preferably the homo- or copolymer radical which is obtainable by homo- or copolymerization of 1-butene, 2-butene and/or isobutene. $R^8$ in use variant 2 is more preferably a polyisobutene radical.

In both use variants 1 and 2, the radical $R^8$ is in particular a radical which is derived from "reactive" polyisobutenes which differ from the "low-reactivity" polyisobutenes by the content of terminal double bonds. Reactive polyisobutenes differ from low-reactivity polyisobutenes in that they have at least 50 mol %, based on the total number of polyisobutene macromolecules, of terminal double bonds. In both use variants 1 and 2, the reactive polyisobutenes preferably have at least 60 mol % and more preferably at least 80 mol %, based on the total number of polyisobutene macromolecules, of terminal double bonds. The terminal double bonds may either be vinyl double bonds [—CH=C(CH$_3$)$_2$] or vinylidene double bonds [—CH$_2$—C(=CH$_2$)—CH$_3$]. Phenols substituted by reactive polyisobutenes and processes for preparing them are described in DE-A-19948111, which is fully incorporated herein by way of reference. In both use variants 1 and 2, preference is given in particular to polyisobutenes which have uniform polymer frameworks. Uniform polymer frameworks are possessed in particular by those polyisobutenes which are composed of at least 85% by weight, preferably of at least 90% by weight and more preferably of at least 95% by weight, of isobutene units. Furthermore, the reactive polyisobutenes preferably have a polydispersity of less than 3.0, in particular less than 1.9 and more preferably less than 1.7 or less than 1.5. Polydispersity is the quotient of the weight-average molecular weight $M_W$ divided by the number-average molecular weight $M_N$.

$R^8$ preferably has a number-average molecular weight in the range from 300 to 3 000, more preferably from 400 to 2 500, for example a number-average molecular weight of about 550, about 800, about 1 000 or about 2 300, and most preferably from 500 to 1 500, for example a number-average molecular weight of about 550, about 800 or about 1 000.

In both use variants 1 and 2, particularly suitable reactive polyisobutenes are, for example, the Glissopal brands from BASF AG, in particular Glissopal 1000 ($M_N$=1 000), Glissopal 550 ($M_N$=550) and Glissopal 2300 ($M_N$=2 300) and mixtures thereof. Other number-average molecular weights can be attained by a manner known in principle by mixing polyisobutenes of different number-average molecular weights or by extractive enrichment of polyisobutenes of certain molecular weight ranges.

$R^8$ is preferably in the p-position to the OH group.

The polyisobutene-substituted phenol V is obtainable, for example, by the reaction (alkylation) of a phenol substituted by m $R^9$ radicals with such a polyisobutene. Suitable for the reaction with reactive polyisobutenes are unsubstituted phenol and mono- or disubstituted phenols. Suitable substituted phenols are in particular mono-ortho-substituted phenols. Suitable alkyl-substituted phenols are 2-methylphenol and 2-ethylphenol. Particularly preferred for the alkylation with polyisobutenes are unsubstituted phenol and 2-methylphenol.

In the alkylation, the phenol is customarily used in an equimolar amount or in excess. Suitable is from about a 1.1- to 10-fold excess, for example an about 1.1-fold, an about 2-fold, an about 4-fold or an about 6-fold, excess of the phenol. The crude product obtained is optionally further reacted after purification, for example as described above in a Mannich(-like) reaction.

After completed reaction, the reaction mixture can be freed of excess phenol and/or catalyst, for example, by extraction with solvents, preferably polar solvents, such as water or $C_1$-$C_6$-alkanols or mixtures thereof, for example by stripping, i.e. by passing through steam or optionally heating of gases, for example nitrogen, distillatively or by basic ion exchangers, as described in the German patent application P 10060902.3.

The alkylation of the phenol is carried out below about 60° C., preferably below 40° C. and in particular below 30° C., in the presence of an alkylation catalyst. In general, the alkylation is carried out at temperatures above −40° C., preferably above −30° C. and in particular above −20° C. Particularly suitable for the alkylation are temperatures in the range from −10 to +45° C., in particular in the range from 0 to +40° C. and more preferably from 10 to +35° C.

Suitable alkylation catalysts are known to those skilled in the art. Suitable are, for example, protic acids such as sulfuric acid, phosphoric acid and organic sulfonic acids, e.g. trifluoromethanesulfonic acid, Lewis acids such as aluminum trihalides, e.g. aluminum trichloride or aluminum tribromide, boron trihalides, e.g. boron trifluoride and boron trichloride, tin halides, e.g. tin tetrachloride, titanium halides, e.g. titanium tetrabromide and titanium tetrachloride; and iron halides, e.g. iron trichloride and iron tribromide. The Lewis acids are optionally used together with Lewis bases such as alcohols, in particular $C_1$-$C_6$-alkanols, phenols or aliphatic or aromatic ethers, for example diethyl ether, diisopropyl ether or anisol. Preference is given to adducts of boron trihalides, in particular boron trifluoride, in combination with the above-mentioned Lewis bases. Particular preference is given to boron trifluoride etherate and boron trifluoride phenolate. For practical reasons, the latter is particularly suitable, since it is formed in the phenolic reaction mixture when introducing boron trifluoride.

Preference is given to carrying out the alkylation in a liquid medium. To this end, the phenol is preferably dissolved in one of the reactants and/or a solvent, optionally with heating. In a preferred embodiment, the alkylation is therefore carried out in such a way that the phenol or the substituted phenol is first melted with the introduction of heat and subsequently admixed with a suitable solvent and/or the alkylation catalyst, in particular the boron trihalide adduct. Afterwards, the liquid mixture is brought to a suitable reaction temperature. In a further preferred embodiment, the phenol is first melted and admixed with the polyisobutene and optionally a suitable solvent. The liquid mixture obtained in this way can be brought to a suitable reaction temperature and subsequently admixed with the alkylation catalyst.

Suitable solvents for the performance of this reaction are, for example, hydrocarbons, preferably pentane, hexane and heptane, in particular hexane, hydrocarbon mixtures, for example benzines having boiling ranges between 35 and 100° C., kerosene fractions having boiling ranges of from 100 to 200° C., aromatic hydrocarbons such as toluene, ethylbenzene, propyl- and isopropylbenzene, n-butylbenzene, sec-butylbenzene, isobutylbenzene, tert-butylbenzene or the xylenes and also mixtures thereof, for example in the form of commercial alkyl aromatics fractions, such as Solvesso 100, 150 or 200, and halogenated hydrocarbons, such as dichloromethane or trichloromethane, and also mixtures of the abovementioned solvents.

The reaction is preferably initiated by adding the catalyst or one of the two reactants, phenol or polyisobutene. The component initiating the reaction is preferably added over a period of from 2 to 300 minutes, preferably from 5 to 200 minutes and in particular from 10 to 180 minutes, and the temperature of the reaction mixture advantageously does not exceed the above-specified temperature ranges. On completion of addition, the reaction mixture is allowed to continue to react preferably for from 5 minutes to 24 hours, in particular from 10 minutes to 6 hours, at a temperature below 30° C. The reaction conditions are preferably selected in such a way that at least 85%, in particular at least 90% and more preferably at least 95% of the polyisobutenylphenol are formed. The polyisobutene-substituted phenols obtained in this way preferably consist of more than 85%, in particular more than 90% and more preferably of more than 95%, of isomers whose polyisobutene radical is in the para-position to the hydroxyl group of the phenol.

The above remarks on the alkylation of phenols V with polyisobutenes apply analogously for the alkylation with other polyolefins.

The phenols V or the Mannich adducts I preferably have a polydispersity in the range from 1.05 to 3.5, in particular from 1.1 to 2.5 and more preferably from 1.1 to 1.9.

The setting of the desired polydispersity can be achieved by precise selection of the starting materials, choice of the stoichiometry, choice of the temperature and reaction time and also optionally of the workup, in particular by suitable purification techniques such as extraction and distillation.

Suitable measures which, individually or in combination, favor the formation of adducts I having increased effectiveness and/or lower polydispersity are selected, for example, from use of polyolefins of lower polydispersity to prepare the phenols V, use of polyolefins having very high proportions of terminal double bonds, use of the polyolefins in an amount that does not exceed the amount of phenols in the alkylation thereof, optionally followed by a subsequent removal of the unconverted phenol, carrying out the alkylation at a very low temperature which nevertheless ensures complete conversion, for example above about +5° C. and below about +40° C., maintenance of a suitable stoichiometry; for example, an aldehyde:amine:phenol V ratio of about 1:1:1 (to prepare monoaminoalkylated Mannich adducts I) or about 2:2:1 (to prepare bisaminoalkylated Mannich adducts I), carrying out the Mannich(-like) reaction with an adduct of amine and aldehyde or aldehyde equivalent in accordance with variant B, in particular in accordance with the above-described preferred embodiments, extraction of the phenol V and/or of the Mannich base with polar organic solvents, for example alcohols such as methanol, ethanol, propanol, isopropanol, n-butanol, sec-butanol, isobutanol and tert-butanol; ketones such as acetone, methyl ethyl ketone, diethyl ketone and cyclohexanone; esters such as methyl acetate, ethyl acetate, propyl acetate, isopropyl acetate, methyl propionate and ethyl propionate; and nitriles such as acetonitrile, propionitrile and butyronitrile.

Preference is given to using component B as a dispersant/detergent because the Mannich adducts can be more easily metered than the amines of component A and because, in contrast to free amines, they constitute no odor nuisance. However, preference is given to using a mixture of components A and B, because such a mixture can satisfy different requirements in different direct-injection engine systems. The weight ratio of component A to component B is preferably from 20:1 to 1:20, more preferably from 10:1 to 1:10 and in particular from 5:1 to 1:5.

In a preferred embodiment of both use variants, the Mannich adduct used, optionally in a mixture with component A, is of the formula I.1

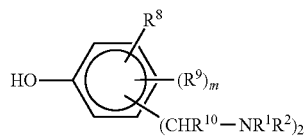

where $R^8$ in use variant 1, is a polyisobutene radical having a number-average molecular weight of preferably from 300 to 3000, or, in use variant 2, is a poly(iso)butene radical having a number-average molecular weight of preferably from 300 to 3000, $R^9$ is a $C_1$-$C_6$-alkyl group, $R^{10}$ is H or $C_1$-$C_6$-alkyl, $R^1$ and $R^2$ are each independently $C_6$-$C_{30}$-alkyl,

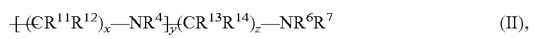 (II),

 (III) or $-[(CR^{11}R^{12})_x-NR^4]_y(CR^{13}R^{14})_z-OR^5$ (IV)

where $R^4$, $R^5$, $R^{11}$, $R^{12}$, $R^{13}$ and $R^{14}$ are each independently H or $C_1$-$C_6$-alkyl, $R^6$ and $R^7$ are each independently H, $C_1$-$C_6$-alkyl or $C_1$-$C_6$-hydroxyalkyl, x and z are each independently a number from 1 to 20, y is a number from 0 to 10 and m is 0 or 1.

$R^9$ is preferably methyl or ethyl.

$R^{10}$, $R^{11}$, $R^{12}$, $R^{13}$ and $R^{14}$ are preferably each H.

In a particularly preferred embodiment of both use variants, a Mannich adduct I.1 is used where m is 0, $R^{10}$ is H and both $R^1$ and $R^2$ are either $C_6$-$C_{10}$-alkyl, in particular $C_8$-alkyl, especially 2-ethylhexyl, or a group of the formula II where $R^{11}$, $R^{12}$, $R^{13}$ and $R^{14}$ are each H, y is 0, z is a number from 3 to 6 and $R^6$ and $R^7$ are each independently H, $C_1$-$C_6$-alkyl or $C_1$-$C_6$-hydroxyalkyl. Preference is given to both $R^6$ and $R^7$ each being methyl, ethyl, propyl, hydroxymethyl or hydroxyethyl. z is especially 3 and $R^6$ and $R^7$ are especially each methyl. Equal preference is given to the use of a Mannich adduct I.1 where m is 0 or 1, $R^9$ is methyl, $R^{10}$ is H, $R^1$ is H and $R^2$ is a group of the formula II where $R^{11}$, $R^{12}$, $R^{13}$ and $R^{14}$ are each H, y is 0, z is a number from 3 to 6 and $R^6$ and $R^7$ are each independently H, $C_1$-$C_6$-alkyl or $C_1$-$C_6$-hydroxyalkyl. Both $R^6$ and $R^7$ are preferably each methyl, ethyl, propyl, hydroxymethyl or hydroxyethyl. z is especially 3 and $R^6$ and $R^7$ are preferably each methyl, i.e. $NR^1R^2$ is especially $N[(CH_2)_3N(CH_3)_2]_2$.

Component A, component B or mixtures thereof can be used as fuel or lubricant concentrates. The individual components A or B or their mixture is present in an amount of preferably from 0.1 to 80% by weight, more preferably from 10 to 70% by weight and in particular from 30 to 60% by weight. Component A, component B or their mixture are present in a diluent. Suitable diluents are, for example, aliphatic and aromatic hydrocarbons, such as Solvent Naphtha. Preference is given to using low-sulfur hydrocarbons as diluents.

The present invention further provides a process for reducing deposits in direct-injection gasoline engines by providing a fuel which comprises a component A or a component B, both of which are as defined above, or a mixture thereof. The remarks made with regard to the preferred embodiments of components A and B apply here correspondingly.

In a preferred embodiment of the process, the engine is operated for preferably more than 80% of the operating time at a lambda value of at least 0.9 up to and including 9, more preferably from 0.95 to 8 and in particular from 0.97 to 6.

The present invention further provides fuel and lubricant compositions for direct-injection gasoline engines, comprising a majority of a hydrocarbon fuel or of a lubricant, and a detergent-active amount of component B, as defined in use variant 2. The remarks made there with regard to the preferred embodiments of component B apply correspondingly. The fuel and lubricant compositions according to the invention preferably comprise component B in an amount of from 5 to 5000 ppm, more preferably from 10 to 1000 ppm and in particular from 20 to 500 ppm.

Useful fuels include all commercial gasoline fuels which are suitable for operating direct-injection gasoline engines.

In a preferred embodiment, the fuel and lubricant compositions comprise at least one Mannich adduct of the formula I.1

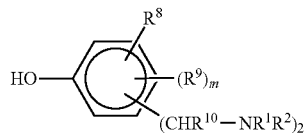

(I.1)

where
R$^8$ is a poly(iso)butene radical having a number-average molecular weight of from 300 to 3000,
R$^9$ is a C$_1$-C$_6$-alkyl group,
R$^{10}$ is H or C$_1$-C$_6$-alkyl,
R$^1$ and R$^2$ are each independently
C$_6$-C$_{20}$-alkyl, C$_6$-C$_{20}$-cycloalkyl, $$\text{+(CR}^{11}\text{R}^{12})_x\text{—NR}^4]_y\text{(CR}^{13}\text{R}^{14})_z\text{—NR}^6\text{R}^7 \quad (II),$$

$$\text{+(CR}^{11}\text{R}^{12})_x\text{—O}]_y\text{(CR}^{13}\text{R}^{14})_z\text{—NR}^6\text{R}^7 \quad (III) \text{ or}$$

$$\text{+(CR}^{11}\text{R}^{12})_x\text{—NR}^4]_y\text{(CR}^{13}\text{R}^{14})_z\text{—OR}^5 \quad (IV)$$

where R$^4$, R$^5$, R$^{11}$, R$^{12}$, R$^{13}$ and R$^{14}$ are each independently H or C$_1$-C$_6$-alkyl,
R$^6$ and R$^7$ are each independently H, C$_1$-C$_6$-alkyl or C$_1$-C$_6$-hydroxyalkyl,
x and z are each independently a number from 1 to 20,
y is a number from 0 to 10 and
m is 0 or 1.

With regard to the preferred definitions of the variables R$^1$ to R$^{14}$ and also of x, z, y and m, the remarks made above apply.

The present application further provides an additive concentrate comprising a component B, at least one diluent and also optionally at least one further additive. Component B is defined as described in use variant 2. The remarks made there with regard to the preferred embodiments of component B apply correspondingly. Component B is present in an amount of preferably from 0.1 to 80% by weight, more preferably from 10 to 70% by weight and in particular from 30 to 60% by weight, based on the weight of the concentrate. Suitable diluents are, for example, aliphatic and aromatic hydrocarbons, such as Solvent Naphtha. Preference is given to using low-sulfur hydrocarbons as diluents.

In addition to component B, the fuel and lubricant compositions according to the invention and also the fuel and lubricant concentrates optionally comprise further customary fuel and lubricant additives, preferably the additives described hereinbelow.

Examples of additives which are used in the fuels and lubricants according to the invention or in the concentrates are further additives other than component B which have detergent action or have valve seat wear-inhibiting action, and each have at least one hydrophobic hydrocarbon radical having a number-average molecular weight (M$_N$) of from 85 to 20 000 and at least one polar moiety selected from
(a) mono- or polyamino groups having up to 6 nitrogen atoms, at least one nitrogen atom having basic properties,
(b) hydroxyl groups in combination with mono- or polyamino groups, at least one nitrogen atom having basic properties,
(c) carboxyl groups or their alkali metal or alkaline earth metal salts,
(d) polyoxy-C$_2$- to —C$_4$-alkylene moieties which are terminated by hydroxyl groups, mono- or polyamino groups, at least one nitrogen atom having basic properties, or by carbamate groups,
(e) carboxylic ester groups,
(f) moieties derived from succinic anhydride and having hydroxyl and/or amino and/or amido and/or imido groups and
(g) moieties obtained by conventional Mannich reaction of phenolic hydroxyl groups with aldehydes and mono- or polyamines.

Examples of above additive components having detergent action include:

Additives containing mono- or polyamino groups (a) are preferably polyalkenemono- or polyalkenepolyamines based on polypropene or on highly reactive (i.e. having predominantly terminal double bonds, usually in the β- and γ-position) or conventional (i.e. having predominantly internal double bonds) polybutene or polyisobutene having an M$_N$ of from 600 to 5000, none of which have been obtained by above-described processes for preparing polyisobutenylphenols. Such additives based on reactive polyisobutene, which can be prepared from the polyisobutene (which may contain up to 20% by weight of n-butene units) by hydroformylation and reductive amination with ammonia, monoamines or polyamines, such as dimethylaminopropylamine, ethylenediamine, diethylenetriamine, triethylenetetramine or tetraethylenepentamine, are disclosed in particular in EP-A 244 616. When polybutene or polyisobutene having predominantly internal double bonds (usually in the β- and γ-position) are used as starting materials in the preparation of the additives, a possible preparative route is by chlorination and subsequent amination or by oxidation of the double bond with air or ozone to give the carbonyl or carboxyl compound and subsequent amination under reductive (hydrogenating) conditions. The amines used here for the amination may be the same as those used above for the reductive amination of the hydroformylated reactive polyisobutene. Corresponding additives based on polypropene are described in particular in WO-A 94/24231.

Further preferred additives containing monoamino groups (a) are the hydrogenation products of the reaction products of polyisobutenes having an average degree of polymerization P of from 5 to 100 with nitrogen oxides or mixtures of nitrogen oxides and oxygen, as described in particular in WO-A 97/03946.

Further preferred additives containing monoamino groups (a) are the compounds obtainable from polyisobutene epoxides by reaction with amines and subsequent dehydration and reduction of the amino alcohols, as described in particular in DE-A 196 20 262.

Additives containing hydroxyl groups in combination with mono- or polyamino groups (b) are in particular reaction products of polyisobutene epoxides, obtainable from polyisobutene having preferably predominantly terminal double bonds and an M$_N$ of from 600 to 5000, with ammonia or mono- or polyamines, as described in particular in EP-A 476 485.

Additives containing carboxyl groups or their alkali metal or alkaline earth metal salts (c) are preferably copolymers of C$_2$-C$_{40}$-olefins with maleic anhydride which have a total molar mass of from 500 to 20 000 and some or all of whose carboxyl groups have been converted to the alkali metal or alkaline earth metal salts and any remainder of the carboxyl groups has been reacted with alcohols or amines. Such additives are disclosed in particular by EP-A 307 815. Such additives can, as described in WO-A 87/01126, advantageously be used in combination with customary fuel detergents such as poly(iso)butenamines or polyetheramines.

Additives containing polyoxy-C$_2$- to C$_4$-alkylene moieties (d) are preferably polyethers or polyetheramines which are obtainable by reaction of $C_2$- to $C_{60}$-alkanols, $C_6$- to $C_{30}$-alkanediols, mono- or di-$C_2$-$C_{30}$-alkylamines, $C_1$-$C_{30}$-alkylcyclohexanols or $C_1$-$C_{30}$-alkylphenols with from 1 to 30 mol of ethylene oxide and/or propylene oxide and/or butylene oxide per hydroxyl group or amino group and, in the case of the polyetheramines, by subsequent reductive amination with ammonia, monoamines or polyamines. Such products are described in particular in EP-A 310 875, EP-A 356 725, EP-A 700 985 and U.S. Pat. No. 4,877,416. In the case of polyethers, such products also have carrier oil properties. Typical examples of these are tridecanol butoxylates, isotridecanol butoxylates, isononylphenol butoxylates and polyisobutenol butoxylates and propoxylates and also the corresponding reaction products with ammonia.

Additives containing carboxylic ester groups (e) are preferably esters of mono-, di- or tricarboxylic acids with long-chain alkanols or polyols, in particular those having a minimum viscosity of 2 $mm^2$ at 100° C., as described in particular in DE-A 38 38 918. The mono-, di- or tricarboxylic acids used may be aliphatic or aromatic acids, and particularly suitable ester alcohols or ester polyols are long-chain representatives having, for example, from 6 to 24 carbon atoms. Typical representatives of the esters are adipates, phthalates, isophthalates, terephthalates and trimellitates of isooctanol, of isononanol, of isodecanol and of isotridecanol. Such products also have carrier oil properties.

Additives containing moieties derived from succinic anhydride and having hydroxyl and/or amino and/or amido and/or imido groups (f) are preferably corresponding derivatives of polyisobutenyl succinic anhydride which are obtainable by reacting conventional or highly reactive polyisobutene having an $M_N$ of from 300 to 5000 with maleic anhydride by a thermal route or via the chlorinated polyisobutene. Particular interest attaches to derivatives with aliphatic polyamines such as ethylenediamine, diethylenetriamine, triethylenetetramine or tetraethylenepentamine. Such gasoline fuel additives are described in particular in U.S. Pat. No. 4,849,572.

Additives containing moieties produced by conventional Mannich reaction of phenolic hydroxyl groups with aldehydes and mono- or polyamines (g) correspond to the above-described Mannich adducts I where the sum of the molecular weight of all $NR^1R^2$ radicals is less than 120 g/mol.

For a more precise definition of the gasoline fuel additives detailed individually, reference is explicitly made here to the disclosures of the abovementioned prior art documents.

Useful solvents or diluents (when providing additive packages and concentrates) include the diluents mentioned above in the case of the concentrates according to the invention, for example aliphatic and aromatic hydrocarbons such as Solvent Naphtha.

Examples of further customary additive components which can be combined with the additives according to the invention are corrosion inhibitors, for example based on ammonium salts of organic carboxylic acids, said salts tending to form films, or on heterocyclic aromatics, antioxidants or stabilizers, for example based on amines such as p-phenylenediamine, dicyclohexylamine or derivatives thereof or on phenols such as 2,4-di-tert-butylphenol or 3,5-di-tert-butyl-4-hydroxyphenylpropionic acid, demulsifiers, antistats, metallocenes such as ferrocene or methylcyclopentadienylmanganese tricarbonyl, lubricity additives such as certain fatty acids, alkyl succinic esters, bis(hydroxyalkyl) fatty amines, hydroxyacetamides or castor oil and also markers. Amines are also optionally added to lower the pH of the fuel.

Further customary components also include carrier oils. These include, for example, mineral carrier oils (base oils), in particular those of the "Solvent Neutral (SN) 500 to 2000" viscosity class, synthetic carrier oils based on olefin polymers having an $M_N$ of from 400 to 1800, in particular based on polybutene or polyisobutene (hydrogenated or unhydrogenated), on poly-alpha-olefins or poly-internal olefins and also synthetic carrier oils based on alkoxylated long-chain alcohols or phenols. Likewise suitable as further additives are polyalkene alcohol-polyetheramines, as described, for example, in DE-199 16 512.2.

The present invention further provides a Mannich adduct of the formula I.1

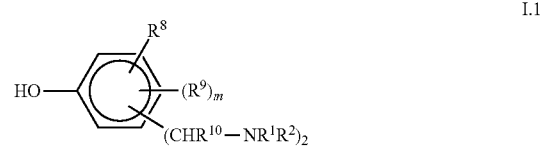

where
$R^8$ is a poly(iso)butene radical having a number-average molecular weight of from 300 to 3000,
$R^9$ is a $C_1$-$C_6$-alkyl group,
$R^{10}$ is H or $C_1$-$C_6$-alkyl,
$R^1$ and $R^2$ are each independently
$C_6$-$C_{20}$-alkyl, $C_6$-$C_{20}$-cycloalkyl,

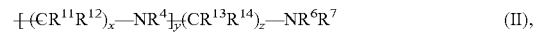 (II),

 (III) or

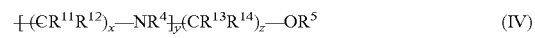 (IV)

where $R^4$, $R^5$, $R^{11}$, $R^{12}$, $R^{13}$ and $R^{14}$ are each independently H or $C_1$-$C_6$-alkyl,
$R^6$ and $R^7$ are each independently H, $C_1$-$C_6$-alkyl or $C_1$-$C_6$-hydroxyalkyl,
x and z are each independently a number from 1 to 20,
y is a number from 0 to 5 and
m is 0 or 1.

With regard to the preferred $R^8$ radicals, reference is made to the above remarks.

$R^9$ is preferably methyl or ethyl, more preferably methyl.

m is 0 or 1 and especially 0.

With regard to the preferred $R^1$ and $R^2$ radicals, the above remarks apply.

In a particularly preferred embodiment, m is 0, $R^{10}$ is H and both $R^1$ and $R^2$ are each either $C_6$-$C_{10}$-alkyl, in particular $C_8$-alkyl, especially 2-ethylhexyl, or a group of the formula II where $R^{11}$, $R^{12}$, $R^{13}$ and $R^{14}$ are each H, y is 0, z is a number from 3 to 6 and $R^6$ and $R^7$ are each independently H, $C_1$-$C_6$-alkyl or $C_1$-$C_6$-hydroxyalkyl. $R^6$ and $R^7$ are preferably both each methyl, ethyl, propyl, hydroxymethyl or hydroxyethyl. z is especially 3 and $R^6$ and $R^7$ are especially each methyl. Equal preference is given to the use of a Mannich adduct I.1 where m is 0 or 1, $R^9$ is methyl, $R^{10}$ is H, $R^1$ is H and $R^2$ is a group of the formula II where $R^{11}$, $R^{12}$, $R^{13}$ and $R^{14}$ are each H, y is 0, z is a number from 3 to 6 and $R^6$ and $R^7$ are each independently H, $C_1$-$C_6$-alkyl or $C_1$-$C_6$-hydroxyalkyl. Both $R^6$ and $R^7$ are preferably each methyl, ethyl, propyl, hydroxymethyl or hydroxyethyl. z is especially 3 and $R^6$ and $R^7$ are preferably each methyl, i.e. both $R^1$ and $R^2$ are each N,N-dimethylaminopropyl.

In a likewise particularly preferred embodiment, the $R^1$ and $R^2$ radicals are each a $C_6$-$C_{10}$-alkyl radical, in particular a $C_8$-alkyl radical, especially 2-ethylhexyl.

The use according to the invention of component A or component B or mixtures thereof leads to a distinct reduction in the formation of deposits at the injection nozzles of direct-injection gasoline engines.

The nonlimiting examples which follow illustrate the invention.

EXAMPLES

I. Preparation of 4-polyisobutenylphenol and of 2-methyl-4-polyisobutenylphenol

I.1 Preparation of 4-polyisobutenylphenol

The preparation was effected starting from phenol and Glissopal 1000 by a process described in DE-A 19948111.

In a 4 l four-neck flask, 203.9 g of phenol were melted under nitrogen at from 40 to 45° C. 95.5 g of $BF_3$-diethyl ether adduct were added dropwise and the mixture was cooled to from 20 to 25° C. 998 g of polyisobutene having an $M_N$ of 1000 and a dimethylvinylidene content of 85%, dissolved in 1800 ml of hexane, were added dropwise at from 20 to 25° C. within 3 hours. Stirring was continued overnight. Subsequently, the reaction was ended by adding 500 ml of 25% ammonia solution. The organic phase was removed and subsequently washed 7 times with 500 ml of water and dried over $Na_2SO_4$, and the solvent was removed under reduced pressure: 1060 g of oil (polyisobutenylphenol).

NMR: 7.2 ppm (doublet, 2H), 6.7 ppm (doublet, 2H), 4.8 ppm (singlet, broad 1H), 1.75 ppm (singlet, 2H), 1.5-0.5 ppm (singlet, 165H).

This corresponds to an $M_N$ of the alkyl radical of 1150. Within the range from 7.1 to 6.75 there are small signals which suggest that, in addition to the main product (p-polyisobutenylphenol), from 5 to 10% of 2,4-substituted phenol have formed which is in agreement with the low molecular weight increase determined.

I.2 Preparation of 2-methyl-4-polyisobutenylphenol

The preparation was effected starting from cresol and Glissopal 1000 by a process described in DE-A 19948111.

In a 4 l four-neck flask, 234.3 g of cresol were melted under nitrogen at from 40 to 45° C. 95.5 g of $BF_3$-diethyl ether adduct were added dropwise and the mixture was cooled to from 20 to 25° C. 998 g of polyisobutene having an $M_N$ of 1000 and a dimethylvinylidene content of 85%, dissolved in 1800 ml of hexane, were added dropwise at from 20 to 25° C. within 3 hours. Stirring was continued overnight. Subsequently, the reaction was ended by adding 500 ml of 25% ammonia solution. The organic phase was removed and subsequently washed 7 times with 500 ml of water and dried over $Na_2SO_4$, and the solvent was removed under reduced pressure. 2-Methyl-4-polyisobutenylphenol was obtained in the form of an oil.

II. Conversion of Polyisobutenylphenols to Mannich Adducts I

II.1 Reaction of the Polyisobutenylphenol from I.1 with Paraformaldehyde and N,N-bis[3-(N',N'-dimethylamino)propyl]amine A 1 l flask equipped with a water separator was initially charged with 219.8 g of 4-polyisobutenylphenol from I.1 in 1000 ml of xylene. 15.1 g of paraformaldehyde were added and the mixture was heated to 90° C. for 1 h. Subsequently, 93.9 g of N,N-bis[3-(N',N'-dimethylamino)propyl]amine were added rapidly, whereupon 8 ml of aqueous phase separated. The solution was concentrated on a rotary evaporator at 145° C. and 5 mbar. A product mixture of 10% of monoaminoalkylated and 90% of bisaminoalkylated polyisobutenylphenol were obtained as a light-colored oil in a yield of 278.4 g. The mono- and bisaminomethylated products were identified by means of the shifting of the benzylic proton (aromatic ring-$CH_2$—$NR^5R^6$) in the $^1H$ NMR spectrum.

II.2 Reaction of the Polyisobutenylphenol from I.1 with Paraformaldehyde and N,N-di(2-ethylhexyl)amine In a similar manner to II.1, the polyisobutenylphenol from I.1 was reacted with paraformaldehyde and N,N-di(2-ethylhexyl)amine in a molar ratio of 1:1.2:1.2. The reaction resulted in a product mixture of 90% of monoaminoalkylated and 4% of bisaminoalkylated polyisobutenylphenol.

II.3 Reaction of the Polyisobutenylphenol from I.1 with Paraformaldehyde and N,N-di(2-ethylhexyl)amine In a similar manner to II.1, the polyisobutenylphenol from I.1 was reacted with paraformaldehyde and N,N-di(2-ethylhexyl)amine in a molar ratio of 1:2.4:2.4. The reaction resulted in a product mixture of 20% of monoaminoalkylated and 80% of bisaminoalkylated polyisobutenylphenol.

II.4 Reaction of the Polyisobutenylcresol from I.2 with Paraformaldehyde and N',N'-3-(dimethylamino)propylamine In a similar manner to II.1, N',N'-3-(dimethylamino)propylamine was reacted with the polyisobutenylcresol from I.2 in a cresol to amine to aldehyde ratio of 1:1:1. The monoaminomethylated cresol was obtained in a yield of 80%. No bisaminomethylated cresol was obtained.

III. Engine Tests

Test Engine:

The test engine used was a modern direct-injection gasoline engine whose cylinder geometry is configured in a such a way that uniform fuel distribution takes place. The experiments were carried out in the lean range.

| | |
|---|---|
| Type: | Four-cylinder, four-stroke, 2.0 l |
| Capacity: | 1998 cm³ |
| Spark plugs/cylinder: | 1 |
| Valves/cylinder: | 4 |
| Bore: | 86 mm |
| Stroke: | 86 mm |
| Injection system: | Common Rail high pressure DI |
| Injection pressure: | approx. 100 bar |
| Temperature of the cooling liquid: | 90° C. |
| Oil temperature: | 94° C. |
| Test cycle: | M 102 E (CEC F-05-A-93), 100 h |
| Fuel: | sulfur-free Superplus to DIN EN 228 |

The fuel was admixed with 5 different additive packages and subjected to the abovementioned test cycle. Subsequently, the appearance in the interior of the injection nozzle was evaluated.

Additive packages: In addition to the additives specified, the solvent contained in all additive packages was a mixture of xylene and $C_{11}$-$C_{14}$-paraffins.

| | |
|---|---|
| Additive package 1 (comparative) | 39% by weight of Mannich adduct a* |
| | 17% by weight of polypropoxylate-fatty alcohol ether |
| | 44% by weight of solvent |
| Additive package 2 (comparative) | 39% by weight of Mannich adduct b** |
| | 17% by weight of polypropoxylate-fatty alcohol ether |
| | 44% by weight of solvent |
| Additive package 3 | 39% by weight of Mannich adduct c*** |
| | 17% by weight of polypropoxylate-fatty alcohol ether |
| | 44% by weight of solvent |
| Additive package 4 | 9% by weight of tridecylamine |
| | 36% by weight of Mannich adduct a* |
| | 15% by weight of polypropoxylate-fatty alcohol ether |
| | 40% by weight of solvent |
| Additive package 5 | 9% by weight of ethylhexylamine |
| | 36% by weight of Mannich adduct a* |

-continued

15% by weight of polypropoxylate-fatty alcohol ether
40% by weight of solvent

*Mannich adduct a: Mannich adduct of the formula I where
m = 0
n = 1
$R^8$ = radical derived from reactive polyisobutene
$R^{10}$ = H
$R^1, R^2$ = methyl
The Mannich adduct a is obtainable by reaction of the polyisobutenylphenol from example I.1 with formaldehyde and dimethylamine in approximately equimolar amounts.
**Mannich adduct b: Mannich adduct of the formula I where
m = 0
n = 1
$R^8$ = radical derived from low-reactivity polyisobutene
$R^{10}$ = H
$R^1$ = H
$R^2$ = 3-N,N-dimethylaminopropyl
The Mannich adduct b is obtainable by reaction according to WO 01/42399, p. 16.
***Mannich adduct c: Mannich adduct of the formula I where
m = 0
n = 2
$R^8$ = radical derived from reactive polyisobutene
$R^{10}$ = H
$R^1, R^2$ = 3-N,N-dimethylaminopropyl The Mannich adduct c is obtainable by reaction according to II.1

| Additive package No. | Dosage [mg/kg] | Appearance in the interior of the injection nozzles |
| --- | --- | --- |
| — | — | heavy deposits |
| 1 | 500 | heavy deposits |
| 2 | 500 | heavy deposits |
| 3 | 500 | clean |
| 4 | 550 | clean |
| 5 | 550 | slight deposits |

As the engine test shows, the components A and B used in accordance with the invention in the additive packages 3 to 5, unlike the prior art additives, substantially prevent the formation of deposits in the engine chamber of direct-injection gasoline engines.

We claim:

1. A process for reducing deposits in direct-injection gasoline engines which comprises:
    directly injecting a fuel into a combustion chamber of a gasoline engine, wherein the directly injecting injects the fuel through a common rail into the combustion chamber through a nozzle disposed in the combustion chamber;
    wherein the fuel comprises:
    a component A comprising at least one amine of the formula $NR^{1a}R^{2a}R^3$ where each of $R^{1a}$, $R^{2a}$ and $R^3$ is independently H or $C_1$-$C_{20}$-alkyl, wherein the alkyl radicals may be interrupted by one $NR^4$ group and/or may be substituted by one $NR^6R^7$ group where $R^4$, $R^6$ and $R^7$ are each independently H or $C_1$-$C_{20}$-alkyl, and the $R^{1a}$, $R^{2a}$, and $R^3$ groups each have a molecular weight of 489 or less; and
    a component B comprising at least one Mannich adduct of the formula I

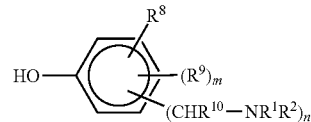

where $R^1$ and $R^2$ are each independently $C_1$-$C_{20}$-alkyl or $C_3$-$C_{20}$-cycloalkyl, and two alkyl radicals together with the nitrogen atom to which they are bonded may form a ring and the alkyl and the cycloalkyl radicals may be interrupted by one or more O groups,
    $R^8$ is a polyisobutene radical,
    $R^9$ is a $C_1$-$C_6$-alkyl group,
    $R^{10}$ is H,
    m is a number from 0 to (4−n) and
    n is a number from 1 to 3.

2. A process for reducing deposits in direct-injection gasoline engines which comprises:
    directly injecting a fuel into a combustion chamber of a gasoline engine, wherein the directly injecting injects the fuel through a common rail into the combustion chamber through a nozzle disposed in the combustion chamber;
    wherein the fuel comprises:
    a component A comprising at least one amine of the formula $NR^{1a}R^{2a}R^3$ where each of $R^{1a}$, $R^{2a}$ and $R^3$ is independently H or $C_1$-$C_{20}$-alkyl, wherein the alkyl radicals may be interrupted by one $NR^4$ group and/or may be substituted by one $NR^6R^7$ group where $R^4$, $R^6$ and $R^7$ are each independently H or $C_1$-$C_{20}$-alkyl, with the proviso that the molecular weight of the amine $NR^{1a}R^{2a}R^3$ is from 120 to 1,000 g/mol and the $R^{1a}$, $R^{2a}$, and $R^3$ groups each have a molecular weight of 489 or less; and
    a component B comprising at least one Mannich adduct of the formula I

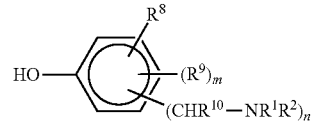

where $R^1$ and $R^2$ are each independently $C_1$-$C_{20}$-alkyl or $C_3$-$C_{20}$-cycloalkyl, and two alkyl radicals together with the nitrogen atom to which they are bonded may form a ring and the alkyl and the cycloalkyl radicals may be interrupted by one or more O groups, with the proviso that the sum of the molecular weights of the radicals $NR^1R^2$ is from 120 to 1,000 g/mol,
    $R^8$ is a polyisobutene radical,
    $R^9$ is a $C_1$-$C_6$-alkyl group,
    $R^{10}$ is H,
    m is a number from 0 to (4−n) and
    n is a number from 1 to 3.

3. The process as claimed in claim 1, wherein at least one of the molecular weight of the amine $NR^{1a}R^{2a}R^3$ in component A and the sum of the molecular weights of the radicals $NR^1R^2$ in component B is from 120 to 1000 g/mol.

4. The process as claimed in claim 2, wherein at least one of the molecular weight of the amine $NR^{1a}R^{2a}R^3$ in component A and the sum of the molecular weights of the radicals $NR^1R^2$ in component B is from 190 to 600 g/mol.

5. The process as claimed in claim 1, wherein the radicals $R^1$, $R^2$, $R^{1a}$, $R^{2a}$ and $R^3$ in components A and B are each independently H or $C_6$-$C_{20}$-alkyl.

6. The process as claimed in claim 1, wherein $R^8$ is a polyisobutene radical which is derived from reactive polyisobutenes.

7. The process as claimed in claim 1, wherein $R^8$ is in the p-position to the OH group.

8. The process as claimed in claim 1, wherein component A and component B are present in a weight ratio of from 20:1 to 1:20.

9. The process as claimed in claim 1, wherein component A and/or component B are employed in the form of a fuel or lubricant concentrate comprising a component A and/or a component B in an amount of from 0.1 to 80% by weight.

10. A process as claimed in claim 1, in which the direct-injection gasoline engine is operated at a lambda value of from 0.9 to 9.

11. The process as claimed in claim 1, wherein n is 1 and the group $CHR^{10}$—$NR^1R^2$ is $CH_2NMe_2$.

12. The process as claimed in claim 2, wherein n is 1 and the group $CHR^{10}$—$NR^1R^2$ is $CH_2NMe_2$.

13. The process according to claim 1, wherein the $R^{1a}$, $R^{2a}$, and $R^3$ groups each have a molecular weight of 281 or less.

14. The process according to claim 1, wherein m in formula I is 0.

15. The process according to claim 2, wherein the $R^{1a}$, $R^{2a}$, and $R^3$ groups each have a molecular weight of 281 or less.

16. The process according to claim 2, wherein m in formula I is 0.

17. A process for reducing deposits in direct-injection gasoline engines which comprises:
    directly injecting a fuel into a combustion chamber of a gasoline engine, wherein the directly injecting injects the fuel through a common rail into the combustion chamber through a nozzle disposed in the combustion chamber;
    wherein the fuel comprises:
    a component A comprising at least one amine of the formula $NR^{1a}R^{2a}R^3$ where each of $R^{1a}$, $R^{2a}$ and $R^3$ is independently a $C_6$-$C_{20}$-alkyl group,
    a component B comprising at least one Mannich adduct of the formula I

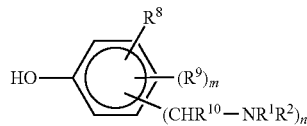

where $R^1$ and $R^2$ are each independently $C_1$-$C_{20}$-alkyl or $C_3$-$C_{20}$-cycloalkyl, and two alkyl radicals together with the nitrogen atom to which they are bonded may form a ring and the alkyl and the cycloalkyl radicals may be interrupted by one or more O groups,
$R^8$ is a polyisobutene radical,
$R^9$ is a $C_1$-$C_6$-alkyl group,
$R^{10}$ is H,
m is a number from 0 to (4−n) and
n is a number from 1 to 3.

18. A process for reducing deposits in direct-injection gasoline engines which comprises:
    directly injecting a fuel into a combustion chamber of a gasoline engine, wherein the directly injecting injects the fuel through a common rail into the combustion chamber through a nozzle disposed in the combustion chamber;
    wherein the fuel comprises:
    a component A comprising at least one amine of the formula $NR^{1a}R^{2a}R^3$ where each of $R^{1a}$, $R^{2a}$ and $R^3$ is independently a $C_6$-$C_{20}$-alkyl group, with the proviso that the molecular weight of the amine $NR^{1a}R^{2a}R^3$ is from 120 to 1,000 g/mol,
    a component B comprising at least one Mannich adduct of the formula I

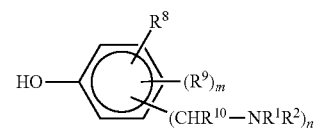

where $R^1$ and $R^2$ are each independently $C_1$-$C_{20}$-alkyl or $C_3$-$C_{20}$-cycloalkyl, and two alkyl radicals together with the nitrogen atom to which they are bonded may form a ring and the alkyl and the cycloalkyl radicals may be interrupted by one or more O groups, with the proviso that the sum of the molecular weights of the radicals $NR^1R^2$ is from 120 to 1,000 g/mol,
$R^8$ is a polyisobutene radical,
$R^9$ is a $C_1$-$C_6$-alkyl group,
$R^{10}$ is H,
m is a number from 0 to (4−n) and
n is a number from 1 to 3.

19. The process of claim 17, wherein $R^1$ and $R^2$ are each independently $C_1$-$C_{20}$-alkyl.

20. The process of claim 18, wherein $R^1$ and $R^2$ are each independently $C_1$-$C_{20}$-alkyl.

21. The process of claim 1, wherein during the directly injecting, the pressure in the common rail is approximately 100 bar.

22. The process of claim 2, wherein during the directly injecting, the pressure in the common rail is approximately 100 bar.

23. The process of claim 17, wherein during the directly injecting, the pressure in the common rail is approximately 100 bar.

24. The process of claim 18, wherein during the directly injecting, the pressure in the common rail is approximately 100 bar.

25. The process as claimed in claim 17, wherein at least one of the molecular weight of the radical $NR^{1a}R^{2a}R^3$ in component A and the sum of the molecular weights of the radicals $NR^1R^2$ in component B is from 120 to 1000 g/mol.

26. The process as claimed in claim 18, wherein at least one of the molecular weight of the radical $NR^{1a}R^{2a}R^3$ in component A and the sum of the molecular weights of the radicals $NR^1R^2$ in component B is from 190 to 600 g/mol.

* * * * *